(12) United States Patent
Urano et al.

(10) Patent No.: US 6,198,481 B1
(45) Date of Patent: Mar. 6, 2001

(54) REMOTE CONTROL TRANSMISSION APPARATUS

(75) Inventors: Sadao Urano; Fumio Satou, both of Tokyo (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 09/172,656

(22) Filed: Oct. 15, 1998

(30) Foreign Application Priority Data

Oct. 16, 1997 (JP) .................................................. 9-297979

(51) Int. Cl.[7] ........................................................ G06F 3/14
(52) U.S. Cl. .......................... 345/348; 345/337; 345/169; 345/179; 345/158; 348/734
(58) Field of Search .................................. 345/348, 336, 345/337, 349, 158, 169, 87, 173, 179, 350; 463/37; 348/734

(56) References Cited

U.S. PATENT DOCUMENTS

| | | | | |
|---|---|---|---|---|
| 4,825,209 | * | 4/1989 | Sasaki et al. | 340/825.72 |
| 5,028,919 | * | 7/1991 | Hidaka | 340/825.72 |
| 5,038,401 | * | 8/1991 | Inotsume | 455/92 |
| 5,237,319 | * | 8/1993 | Hidaka et al. | 340/825.72 |
| 5,561,446 | * | 10/1996 | Montlick | 345/173 |
| 5,578,999 | * | 11/1996 | Matsuzawa et al. | 340/825.22 |
| 5,684,970 | * | 11/1997 | Asuma et al. | 345/348 |
| 5,886,753 | * | 3/1999 | Shinyagaito et al. | 348/734 |
| 5,898,398 | * | 4/1999 | Kumai | 341/176 |
| 5,936,611 | * | 8/1999 | Yoshida | 345/158 |
| 5,973,677 | * | 10/1999 | Gibbons | 345/179 |

* cited by examiner

*Primary Examiner*—Raymond J. Bayerl
*Assistant Examiner*—Thomas T. Nguyen
(74) *Attorney, Agent, or Firm*—Armstrong, Westerman, Hattori, McLeland & Naughton (57) ABSTRACT

The present invention is to offer a remote control transmission apparatus which permits learning of control data for a plurality of devices without increasing the number of operating areas (kn) on the operating panel and provides a clear indication of the relationship between each operating area (kn) and the contents of control at the time when that operating area (kn) is pressed. In the learning mode, control data detected from a received remote control signal are stored in correspondence with a predetermined operating area (kn), and a predetermined one of plural icons is stored in correspondence with a predetermined operating area (kn). In the transmission mode, the contents of control at the time when the operating area (kn) is pressed can be displayed by the selected icon, providing a clear indication of their relationship and hence preventing a user from erroneous remote control operation.

5 Claims, 10 Drawing Sheets

REMOTE CONTROL TRANSMISSION APPARATUS

BACKGROUND OF THE INVENTION

1. Field of the Invention

The present invention relates to a remote control transmission apparatus equipped with a learning function which is adapted to store control data for controlled devices of other remote control transmission apparatus and retransmit thereto the stored control data.

2. Description of the Prior Art

In general, a TV receiver, a VTR, a laser disc and similar audiovisuals are provided with remote control transmission apparatus for remote control of their operations. This remote control requires a different remote control transmission apparatus for each audiovisual. Hence, it takes much time to determine which remote control apparatus to use in case the number of audiovisuals involved is large. The remote operation of all the audiovisuals through the use of the same remote control transmission apparatus, if possible, would provide enhanced operability of remote control. From this point of view, there has been developed a remote control transmission apparatus with a learning function which is adapted to store control data of controlled devices of a plurality of remote control transmission apparatus and retransmit thereto the stored control data.

Figure 10:
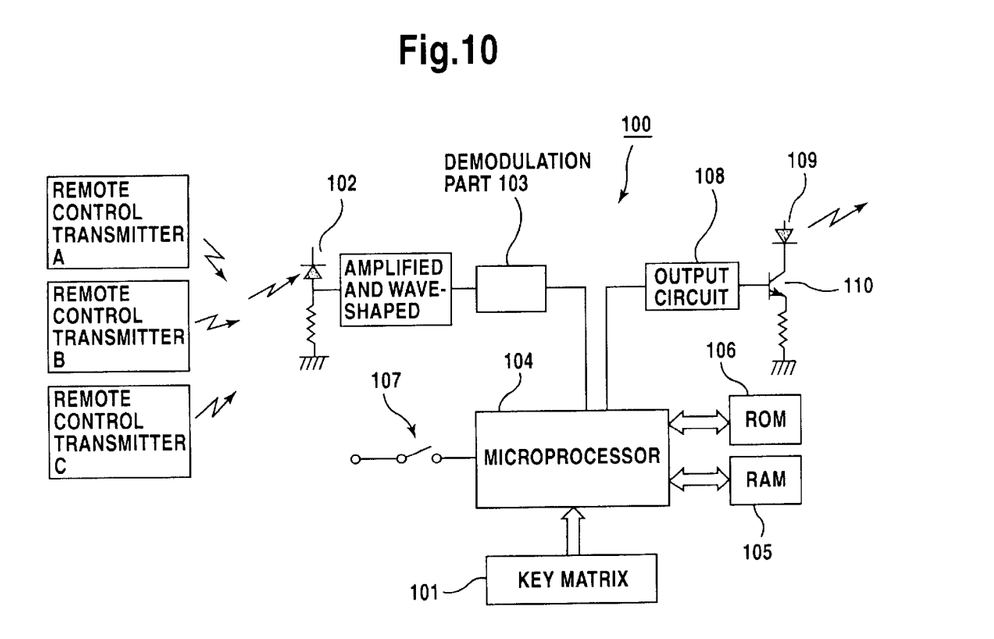
FIG. 10 is a block diagram depicting the configuration of a conventional remote control transmission apparatus with a learning function.
Figure 11:
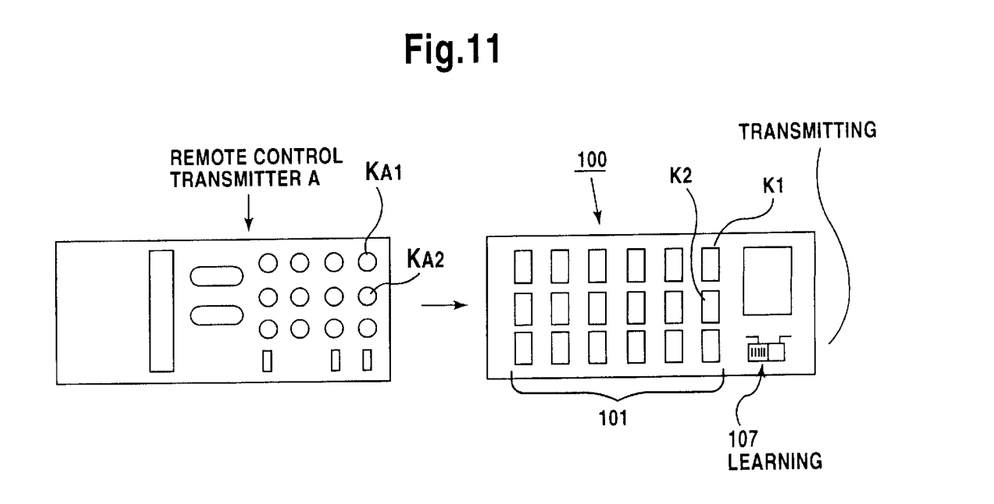
FIG. 11 is a top plan view for explaining how control data of a remote control transmitter is stored in the conventional remote control transmission apparatus shown in FIG. 10.

With reference to FIGS. 10 and 11, the conventional remote control transmission apparatus equipped with a learning function, identified generally by 100, will be described. The remote control transmission apparatus 100 stores and retransmit control data of remote control transmission apparatus (hereinafter referred to as remote control transmitters) A, B, C, . . . which are used for remote operation of different audiovisuals. For example, in the case of storing control data of the remote control transmitter A, its transmitting side is directed toward the receiving side of the remote control transmission apparatus 100(refer to FIG. 11), and a mode selection switch 107 of the latter is set at a learning side. Then, by depressing a key KA1 of the remote control transmitter A from which is sent control data d (for example, to switch on a TV receiver which is a controlled device) to be stored is pressed, and at the same time, depressing a key k1 arbitrarily selected from a key matrix 101 of the remote control transmission apparatus 100 is pressed, by which the control data d is stored in correspondence with the pressed key k1.

That is, upon depression of the key KA1, a remote control signal containing the control data d is sent from the remote control transmitter A to the remote control transmission apparatus 100, wherein it is received by a photodiode, thereafter being amplified and wave-shaped and being fed into a demodulation part 103. The demodulation part 103 detects from the remote control signal its transmission format f and the control data d, and provides them to a microprocessor 104. The microprocessor 104 is connected to the key matrix 101 so that, upon depression of any one of the keys in the key matrix 101, the key code of the depressed key is input into the microprocessor 104. Assuming that the key k1 is already depressed when the control data d is input into the microprocessor 104 from the demodulation part 103 as mentioned above, the transmission format f and the control data d are stored in a RAM 105 at the address corresponding to the key code of the key k1. In a ROM 106 connected to the microprocessor 104 there are stored programs for its operation.

Setting the mode selection switch 107 to the transmitting side after the learning operation and depressing, for example, the key k1, its key code is provided from the key matrix 101 to the microprocessor 104. When the mode selection switch 107 is held at the transmitting side, the microprocessor 104 reads out the transmission format f and the control data d stored in the RAM 105 at the address corresponding to the key code of the key k1, and provides them to an output circuit 108. Based on transmission data generated from the transmission format f and the control data d, the output circuit 108 drives a driving transistor 110 connected to a light emitting diode 109, from which is transmitted a remote control signal containing the control data d and having the same transmission format as that used by the remote control transmitter A.

By simultaneous depression of any one of the keys KA1, KA2, . . . of the remote control transmitter A and an arbitrary one of the keys k1, k2, . . . of the key matrix 101 on the remote control transmission apparatus 100 as described above, control data transmitted by the depression of the key of the remote control transmitter A is stored in correspondence to the key depressed on the remote control transmission apparatus 100. The same holds true with regard to the other remote control transmitters B, C, . . . for remote operation of other audiovisuals. Thus, the single remote control transmission apparatus 100 can be used for remote control of a plurality of audiovisuals irrespective of their categories, makers and so forth.

In such a remote control transmission apparatus 100 with a learning function, however, it is necessary that keys corresponding to all keys of the remote control transmitters A, B, C, . . . to be learned be disposed on the operating panel—this imposes limitations on the design of the operating panel and impairs its usability because it is cumbersome to search a number of keys for a desired one to operate.

The contents and kinds of the control data to be stored vary with the categories or makers of the devices to be controlled. It is impossible to predetermine the number of keys and their arrangement on the remote control transmission apparatus 100 to accommodate such a variety of control data. It is conventional to store the control data in a one-to-one correspondence with user's arbitrarily selected keys on the remote control transmission apparatus 100. However, the learning operation, which is common to all the keys, makes unclear the correspondence between the keys and the stored control data—this incurs the possibility of even the depression of a desired key resulting in erroneous activation of an unintended device different from the desired one or erroneous execution of an unintended operation.

Conventionally, users affix to all the keys labels bearing indications of the learned contents of control data, but affixing such labels to all the keys concerned is troublesome and time-consuming.

When plural pieces of control data are stored in association with each key with a view to avoid an increase in the number of keys on the operating panel, it is difficult to indicate all the contents of the control data involved on the label because of limited space on the operating panel.

SUMMARY OF THE INVENTION

It is therefore an object of the present invention to provide a remote control transmission apparatus which permits clear indication of the contents of control data stored corresponding to the key to be pressed and precludes the possibility of erroneous operation in remote control.

Another object of the present invention is to provide a remote control transmission apparatus which permits learning of control data for a plurality of devices without the need for increasing the number of keys on its operating panel and provides a clear indication of the correspondence between the contents of control data and the corresponding key to be pressed.

According to a first aspect of the present invention, there is provided a remote control transmission apparatus which comprises: receiving means for receiving a remote control signal containing control data for controlling a device from another remote control transmission apparatus; detecting means for detecting the control data from the received remote control signal; keying means divided into a plurality of key or operating areas; first control data storage means for storing the control data in correspondence with a predetermined one of the plurality of operating areas; icon selecting means for selecting a predetermined icon from plural kinds of icons; icon storage means for storing the selected icon in correspondence with the operating area indicated by the selected icon; first display means for displaying the stored icon in the operating area corresponding thereto; transmitting means for transmitting a remote control signal containing control data to a device to be controlled; and mode selecting means for selecting either one of learning and transmitting modes of operation.

In the learning mode the control data detected from the received remote control signal and the icon selected from the plural kinds of icons are stored in the predetermined areas, respectively. In the transmitting mode, if an icon is stored in correspondence with one of the plurality of operating areas, the corresponding operating area is indicated by the icon, and if control data is stored in correspondence with one of the operating areas, the corresponding operating area is depressed to transmit a remote control signal containing the stored control data to the device to be controlled.

In the learning mode, an icon indicating the contents of stored control data can be selected from the plural kinds of icons and stored in correspondence with the operating area associated with the stored control data.

Hence, in the transmitting mode the contents of control data corresponding to the operating area to be depressed is indicated by the selected icon, allowing ease in locating the operating area to be pressed for remote control.

In operating areas in correspondence with which no control data is stored, too, there can be displayed predetermined icons which indicate their captions or the like.

According to a second aspect of the present invention, the keying means is a transparent touch panel which is laminated over the first display means formed by a liquid crystal panel and which is divided into key or operating areas arranged in a matrix form.

Since the display part formed by a liquid crystal panel and the transparent touch panel are laminated, the keying part and the display part can be located at the same position; hence, the operating panel becomes neither large nor complicated.

Since plural kinds of icons can be displayed on the display part in corresponding to the same operating area, it is possible to store plural pieces of control data in association with one operating area and indicate their contents by different icons.

According to a third aspect of the present invention, the keying means is a transparent tablet which has a plurality of key or operating areas divided according to the coordinates of positions on the tablet sheet where to press it. The transparent tablet is laminated over the first display means formed by a liquid crystal panel.

Since it is possible to detect the pressed one of the plurality of operating areas from the coordinates of the position on the tablet sheet where it is pressed, the operating areas need not be arranged in matrix form, and hence their shape can be designed as desired.

The laminated structure of the display part and the transparent touch panel enables the keying part and the display part to be located at the same position; hence, the operating panel becomes neither large nor complicated.

Since plural kinds of icons can be displayed on the display part in correspondence with the same operating area, it is possible to store plural pieces of control data in association with one operating area and indicate their contents by different icons.

According to a fourth aspect of the present invention, in the learning mode, the icon selecting means causes plural kinds of icons to be displayed in the operating area by the first display means one after another so that, by pressing the operating area, the icon displayed in the area just as it is pressed, is selected as a predetermined icon.

Since the icon is selected in the learning mode through utilization of the first display means which displays icons in the operating areas in the transmitting mode, the first display means can be used in common to the both modes of operation.

According to a fifth aspect of the present invention, there is provided a remote control transmission apparatus which comprises: receiving means for receiving a remote control signal containing control data for controlling a device from another remote control transmission apparatus; detecting means for detecting the control data from the received remote control signal; second display means for displaying an icon and a cursor in a display part; icon selecting means for selecting a predetermined icon from plural kinds of icons; icon displaying means for displaying the selected icon on the display part at an arbitrary position; second control data storage means for storing the control data in correspondence with the position where the predetermined icon is stored; coordinate input means for controlling the movement of the cursor on the display part and for inputting the cursor coordinates by an input switch actuation; transmitting means for transmitting a remote control signal containing control data to a device to be controlled; and mode selecting means for selecting either one of learning and transmitting modes of operation.

In the learning mode, the control data decoded from the received remote control signal and the icon selected from the plural kinds of icons are stored in correspondence with predetermined icon display positions, respectively. In the transmitting mode, the selected icon is displayed at the icon display position associated therewith, and when the cursor coordinates input via the coordinate input means are at the icon display position, the control data stored in correspondence with the said icon display position is transmitted to a device to be controlled, together with a remote control signal.

In the learning mode, control data from another remote control transmission apparatus can be stored in correspondence with the icon display position where the icon selected from the plural kinds of icons is stored.

Accordingly, in the transmitting mode, by moving the cursor to the position where an icon indicating the contents of control data is displayed and then actuating the input switch of the coordinate input means, the control data stored in correspondence with the icon display position is transmitted to the device to be controlled, together with the remote control signal, thereby controlling the device based on the contents of control data indicated by the selected icon.

Furthermore, since a predetermined icon can be displayed on the display part at an arbitrary position irrespective of whether control data is being stored in correspondence therewith, the icon can be used as a caption of other icons.

Other objects, features and advantages of the present invention will become more apparent from the following detailed description taken in conjunction with the accompanying drawings.

DESCRIPTION OF THE PREFERRED EMBODIMENTS

A detailed description will be given, with reference to the accompanying drawings, of embodiments of the present invention.

Embodiment 1

Figure 1:
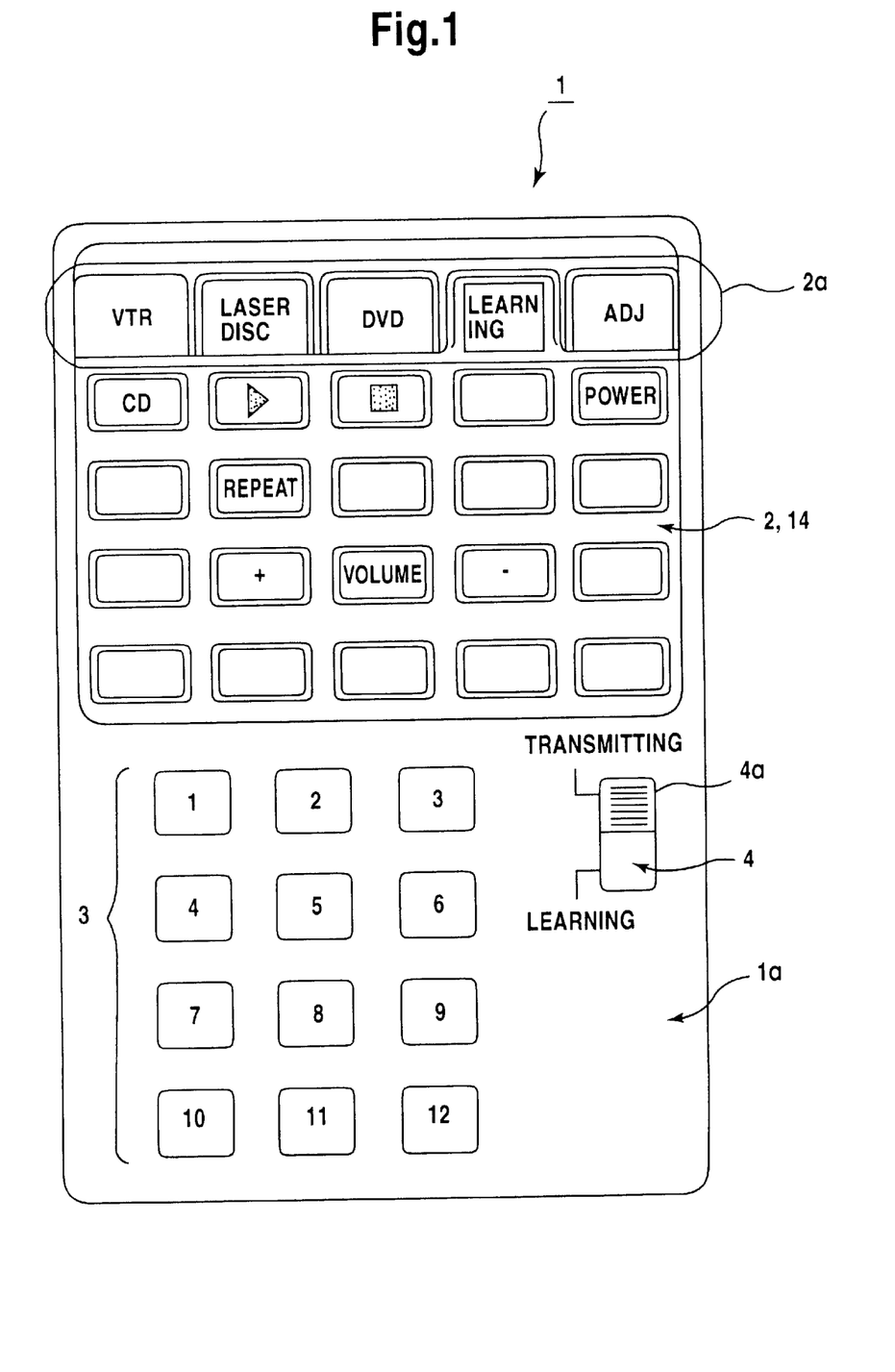
FIG. 1 is a top plan view illustrating an operating surface of a remote control transmission apparatus according to a first embodiment of the present invention.

FIG. 1 is a top plan view depicting the operating surface 1*a* of the remote control transmission apparatus (hereinafter referred to simply as a "remote control") 1 according to a first embodiment of the present invention. On the operating panel 1*a* there are disposed a transparent touch panel 2 serving as input means, a key matrix 3 composed of keys bearing indications of numbers 1 to 12, respectively, and a slide switch 4. The slide switch 4 is to select the mode of operation of the remote control 1, and is switchable between learning and transmitting mode by sliding its control knob 4*a* accordingly.

Figure 2:
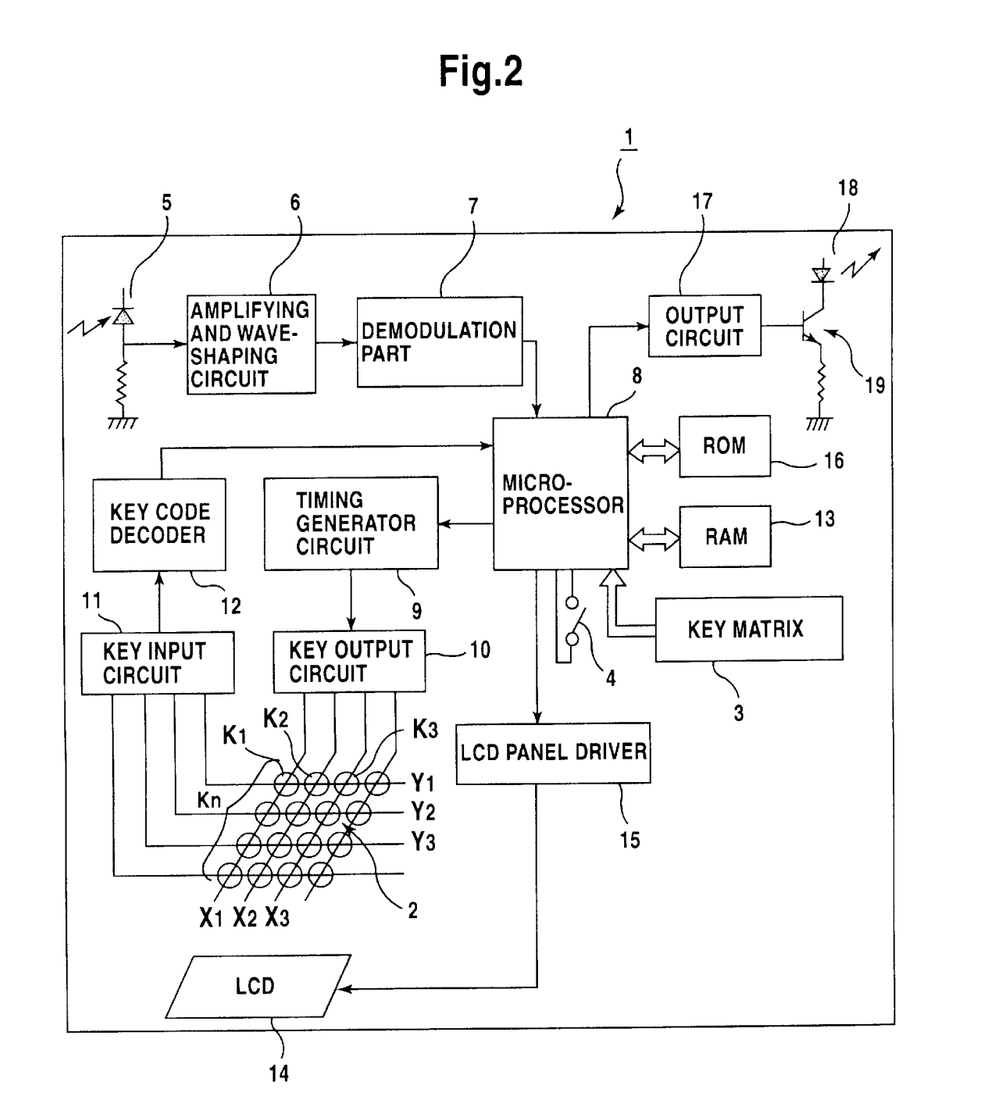
FIG. 2 is a block diagram depicting the configuration of the remote control transmission apparatus shown in FIG. 1.

FIG. 2 illustrates in block form the configuration of the remote control 1, which will be described below in conjunction with its operation in the learning and transmitting modes, respectively.

In the learning mode with the control knob 4*a* of the slide switch 4 held at the learning position, as is the case with the aforementioned remote control transmission apparatus 100, the transmitting side of a remote control transmitter (not shown) from which to send control data to be stored is directed toward the rear end (the lower end in FIG. 1) of the remote control 1 in opposing relation thereto, and that one of keys of the remote control transmitter which user wants to correspond to the control data is pressed. By pressing the key, an infrared signal containing, for example, control data d1 (for turning ON/OFF the power of a CD which is a device to be controlled, for instance) is transmitted to the remote control 1. The remote control 1 has at its rear end a photodiode 5 shown in FIG. 2, which receives and converts the infrared signal to an electric signal.

The infrared signal thus converted to the electric signal is amplified and wave-shaped by an amplifying and wave-shaping circuit 6, from which it is applied to a demodulation part 7. The demodulation part 7 demodulates the control data d1 from the input signal, and detects the transmission format f of the infrared signal, thereafter providing them to a microprocessor 8.

While the microprocessor 8 is set in the learning mode, the transmission format f and the control data d1 input thereinto are processed with inputting a key code indicating the position on the transparent touch panel 2 where it was pressed.

To detect the position on the transparent touch panel 2 where it was pressed and to provides the detected position as the key code to the microprocessor 8, a timing generator circuit 9 and a key output circuit 10 are connected between the output of the microprocessor 8 and the input of the transparent touch panel 2. Further, a key input circuit 11 and a key code decoder 12 are connected between the output of the transparent touch panel 2 and the input of the microprocessor 8.

The transparent touch panel 2 is formed by a pair of opposed flexible transparent insulating films separated by an insulating spacer with a shallow gap defined therebetween. On opposite faces of the two insulating films there are formed, by evaporation of gold (Au), ITO or the like, pluralities of parallel stripe electrodes x1, x2, x3, . . . and y1, y2, y3, . . . , respectively. The electrodes x1, x2, x3, . . . and y1, y2, y3, . . . formed across the two films cross at right angles, and their intersections form operating areas k1, k2, k3, . . . which are arranged in a matrix form as indicated generally by kn. The electrodes intersecting at each operating area kn are slightly separated by the insulating spacer as referred to above, but they are easily shorted with the touch of a finger on the touch panel 2, indicating which operating area kn is being pressed.

The timing generator circuit 9 applies a timing signal of a predetermined period to the key output circuit 10. Supplied with the timing signal, the key output circuit 10 forces the electrodes x1, x2, x3, . . . , formed on the one film of the transparent touch panel 2, to the high level one after another. Upon pressing any one of the operating areas kn, that one of the electrodes y1, y2, y3, . . . forming the pressed operating area kn goes to the high level, which is provided to the key input circuit 11. The key input circuit 11 provides data on the electrode yn having becoming high-level and its timing to the key code decoder 12. Based on these pieces of data fed thereto, the key code decoder 12 detects the pressed operating area kn and supplies the microprocessor 8 with a key code indicating the pressed operating area kn.

When supplied with the key code from the key code decoder 12, the microprocessor 8 stores the transmission format f and the control data d1 input thereinto from the demodulation part 7 in a RAM 13 at an address defined by the key code and a category selection code (described later on).

Underlying the transparent touch panel 2 is a liquid crystal display (hereinafter referred to as LCD) panel 14 held in parallel thereto. The LCD panel 14 is driven by an LCD panel driver 15 connected to the microprocessor 8, and responds to the instructions therefrom to provide various displays. In a ROM 16 connected to the microprocessor 8 there are stored programs for operating the microprocessor 8 and various pieces of display data which are used to cause the LCD panel 14 to display an input-item screen corresponding to categories of devices to be controlled. The respective pieces of display data are stored at addresses corresponding to category selection codes.

Figure 4:
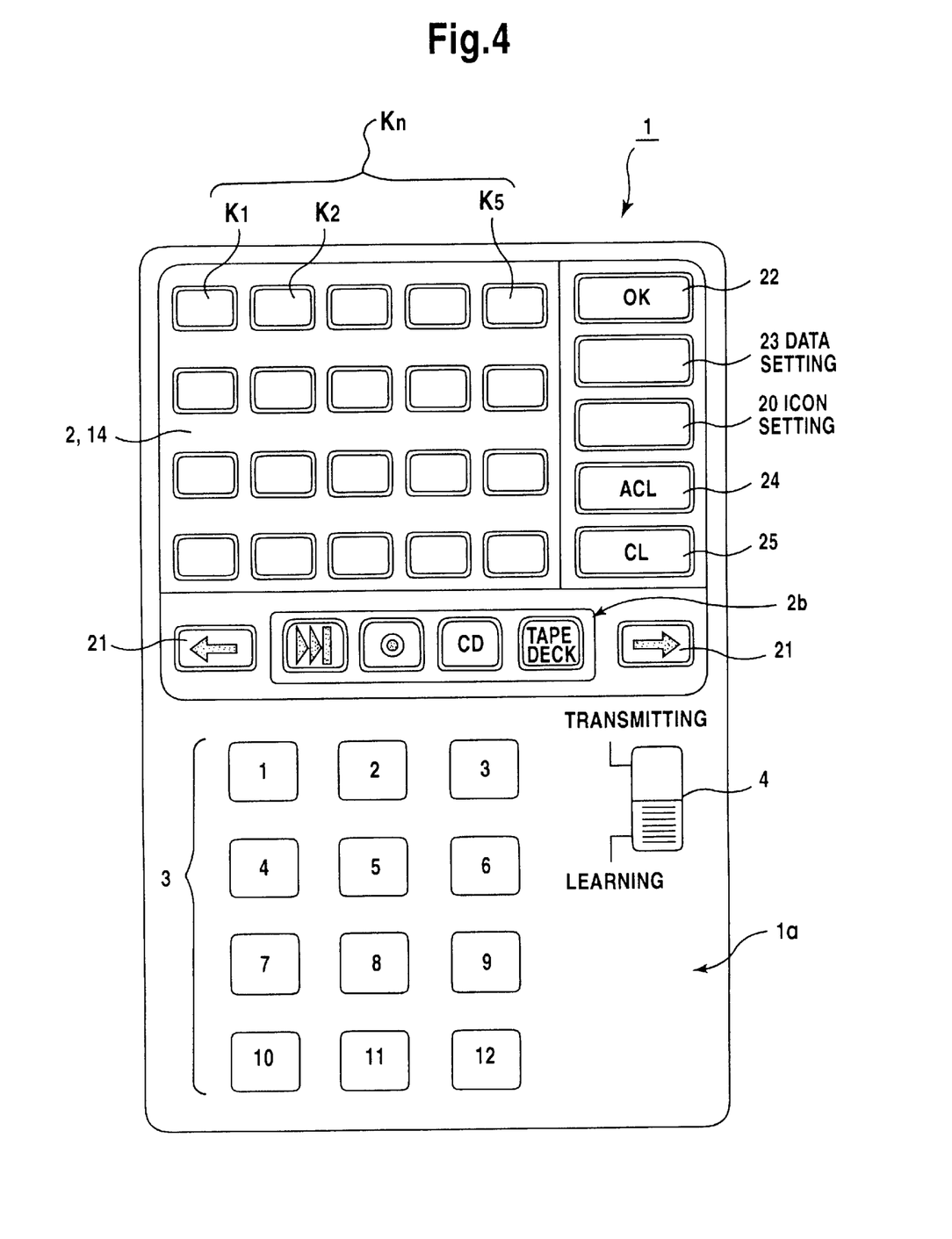
FIG. 4 is a top plan view of the remote control transmission apparatus on which a "learning" input picture is being displayed.

By pressing a desired operating area kn in a category display field 2a in the transmission-item screen shown in FIG. 1, the category selection code is fed from the key code decoder 12 to the microprocessor 8. For example, when pressing the operating area kn bearing an indication "learning" after sliding the slide switch 4 to the learning side in the transmission-item screen in FIG. 1 to enter the learning mode, a category selection code indicating "learning" is used to read out the corresponding display data from the ROM 16, and a "learning" input-item screen depicted in FIG. 4 is displayed on the LCD panel 14. In the "learning" input-item screen, double-framed keys are displayed at the positions of the respective operating areas kn and, at the right-hand side of the key matrix, icons for registering and erasing icon control data.

In the ROM 16 there are further stored various icons indicating categories of the devices to be controlled (for example, TV receiver, CD, DVD , etc.) and the contents of control (for example, switch ON, volume control, playback, fast forwarding, rewinding, etc.). In the "learning" input-item screen depicted in FIG. 4, four kinds of icons are displayed on an icon display field 2b, and by the method described later on, learning can be made so that a selected one of the four kinds of icons is displayed on a desired operating area kn (for example, "power" on an operating area k5 in FIG. 5). That is, in the learning mode the microprocessor 8 stores a desired one of the four icons, selected by the icon selecting operation described later on, in the RAM 13 at an address defined by the key code of the operating area kn pressed at that time and the category selection code indicating "learning." In this way, the microprocessor 8 stores a given icon in correspondence to the operating area where to display it.

Incidentally, the key matrix 3 connected to the microprocessor 8 is used as auxiliary input means of the transparent touch panel 2 for channel selection of a TV receiver and playback of tunes from a CD in a selected sequence, for instance. The matrix 3 comprises, as shown, twelve push-buttons arranged in matrix form, and outputs to the microprocessor 8 key codes indicating numerals 1 to 12 which are used in common to devices to be controlled. Needless to say, the key matrix 3 may be replaced with the transparent touch panel 2, in which case the key matrix 3 can be omitted.

In the transmission mode with the control knob 4a of the slide switch 4 held at the transmission side, such a transmission-item screen as depicted in FIG. 1 is displayed on the LCD panel 14. In the transmission mode, the depression of any one of the operating areas kn in the category display field 2a provides a display of the transmission-item screen indicated in the depressed operating area kn.

Figure 6:
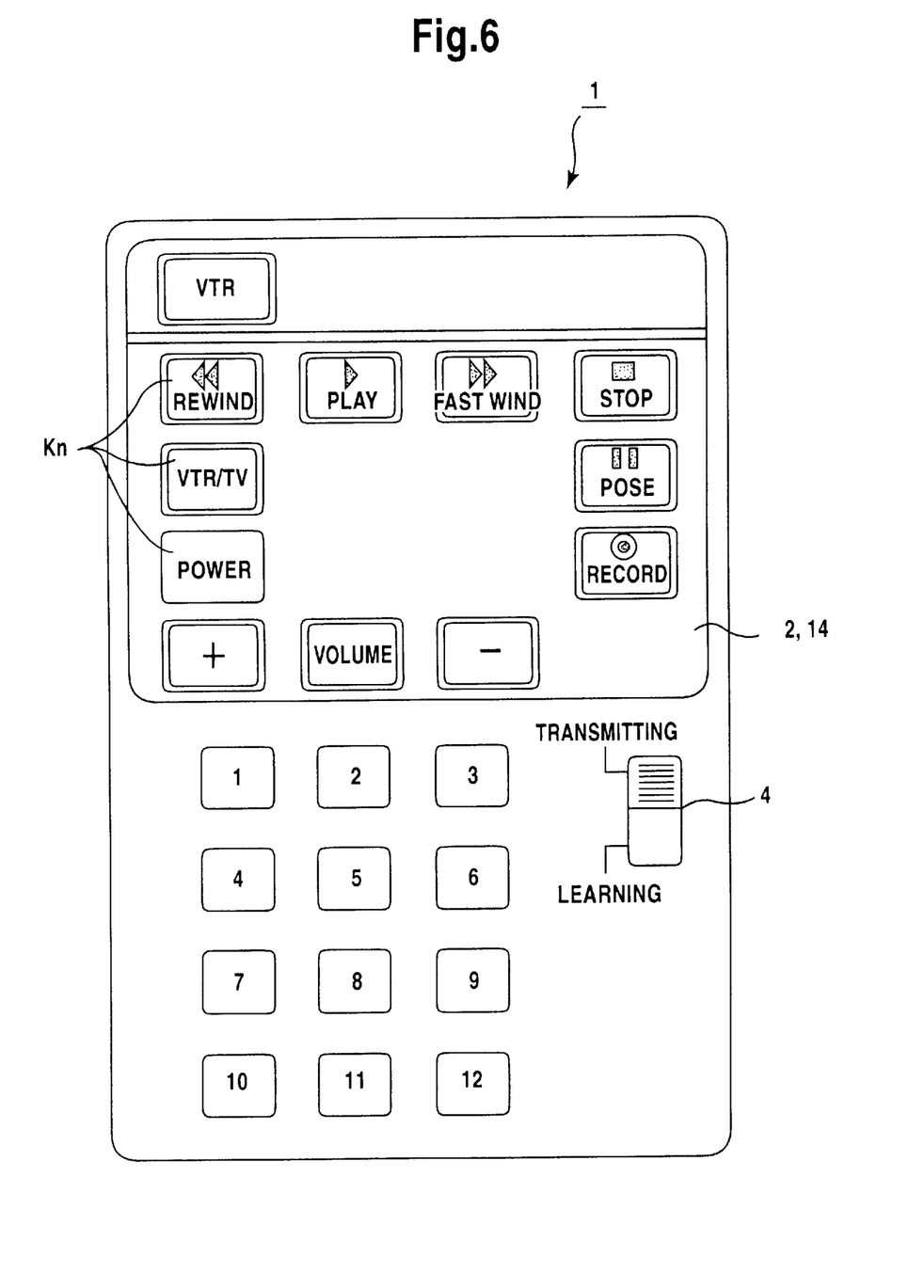
FIG. 6 is a top plan view of the remote control transmission apparatus on which a "VTR" input picture is being displayed.

FIG. 6 depicts a "VTR" transmission-item screen displayed on the LCD panel 14 by a category selection code "VTR" when an operating area kn indicated by an icon "VTR" is pressed. In the "VTR" transmission-item screen there are displayed instructions necessary for VTR operation, and control data for executing each instruction is stored in correspondence with the operating area kn indicating the instruction. The displays and control data stored in correspondence with these operating areas kn are those prestored in the ROM 16.

FIG. 1 shows the "learning" transmission-item screen displayed when the icon "learning" is pressed in the transmission mode, and the icon stored in the aforementioned learning mode is displayed in a designated operating area kn. That is, in case the selected icon is stored in the RAM 13 at the address defined by the key code of that operating area kn and the category selection code indicating "learning", the selected icon is displayed in a double-framed key below that operating area kn.

In the transmission mode, upon pressing a particular one of the operating areas kn, the key code representing the pressed operating area kn is provided from the key code decoder 12 to the microprocessor 8, which uses the input key code and the category selection code at that time to read out of the RAM 13 the data stored at the corresponding address.

If the aforementioned transmission format f and control data d1 are stored in the RAM 13 at that particular address, the microprocessor 8 sends the transmission format f and the control data d1 to an output circuit 17.

The output circuit 17 generates from the transmission format f and the control d1 a PPM-modulated signal, then subjects a 38-kHz carrier frequency to secondary modulation by the PPM-modulated signal, and applies the secondary-modulated signal to a driving transistor 19.

The driving transistor 19 connected to a light emitting diode 18 is controlled by the secondary-modulated signal to drive it. The light emitting diode 18 transmits, as an infrared signal, a remote control signal which contains the control data d1 and has the same transmission format f as the receiving-side remote control transmitter.

Figure 3:
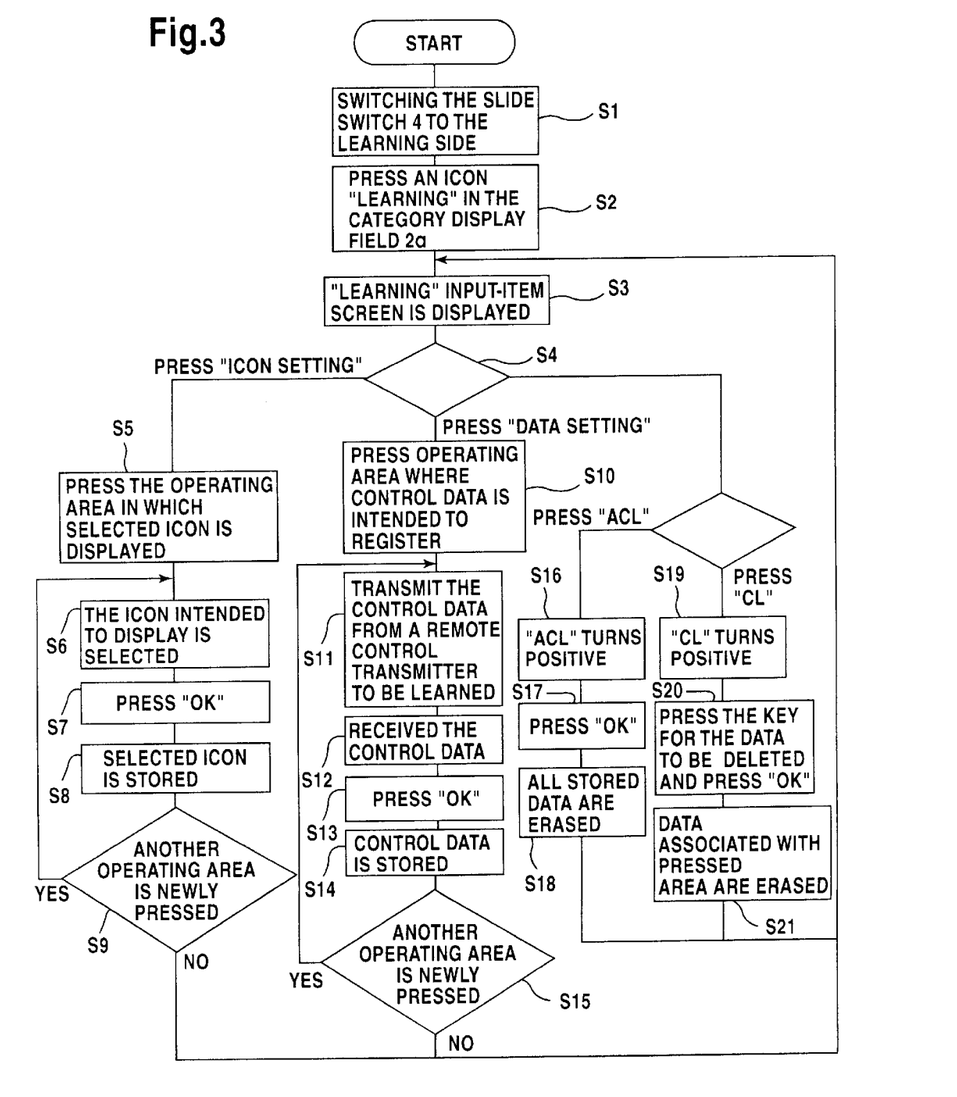
FIG. 3 is a flowchart showing operations of the remote control transmission apparatus in a learning mode.

Turning now to FIG. 3, the operating procedure of the remote control 1 in the learning mode will be described below. The procedure starts with switching the slide switch 4 to the learning side to enter the learning mode (step S1).

The next step is to press an icon "learning" in the category display field 2a (see FIG. 1) displayed at that time(step S2), by which the "learning" input-item screen depicted in FIG. 4 is displayed on the LCD panel 14 (step S3). In the "learning" input-item screen, the operating areas kn in correspondence with (hereinafter referred to simply as "for") which control data is stored is displayed as positive and the operating area kn for which no control data is stored is displayed as negative, irrespective of whether the corresponding icons are already displayed or not.

After the "learning" input-item screen is displayed, the remote control 1 stays in the wait state until the transparent touch panel 2 is pressed (step S4). Pressing an operating area 20 bearing an indication "icon setting," it is displayed as positive, and the operating procedure proceeds to an icon learning mode which starts at step S5.

In step S5 an operating area kn where to display a desired icon is selected and then pressed. For example, in the case of newly adding a CD as a device to be controlled and displaying an icon "power" indicating instructions for ON/OFF control of the CD power supply in an operating area k5 in FIG. 4, this operating area k5 is pressed.

Incidentally, the pressed operating area kn blinks until the icon is stored in correspondence therewith.

Following this, the icon intended to display is selected (step S6). This icon is selected from the four kinds of icons displayed in the icon display field 2b in the "learning" input-item screen. Upon each pressing of either one of right and left arrow keys 21 displayed at the opposite ends of the icon display field 2b, the four kinds of icons in the icon display field 2b are scrolled in the direction of the pressed arrow key 21, and a new icon called from the ROM 16 is displayed at the side opposite to the direction of scroll. Accordingly, the scrolling is continued until a desired icon ("power", for instance) appears in the icon display field 2b; the desired icon is selected by pressing it when it appears in the field 2b. Pressing the icon, the corresponding operating area kn in the icon display field 2b blinks.

The operating area kn of the selected icon and the operating area kn where to display the selected icon are now blinking as mentioned above; after making sure that they are correct, an operating area 22 bearing an indication "OK" is pressed (step S7).

Figure 5:
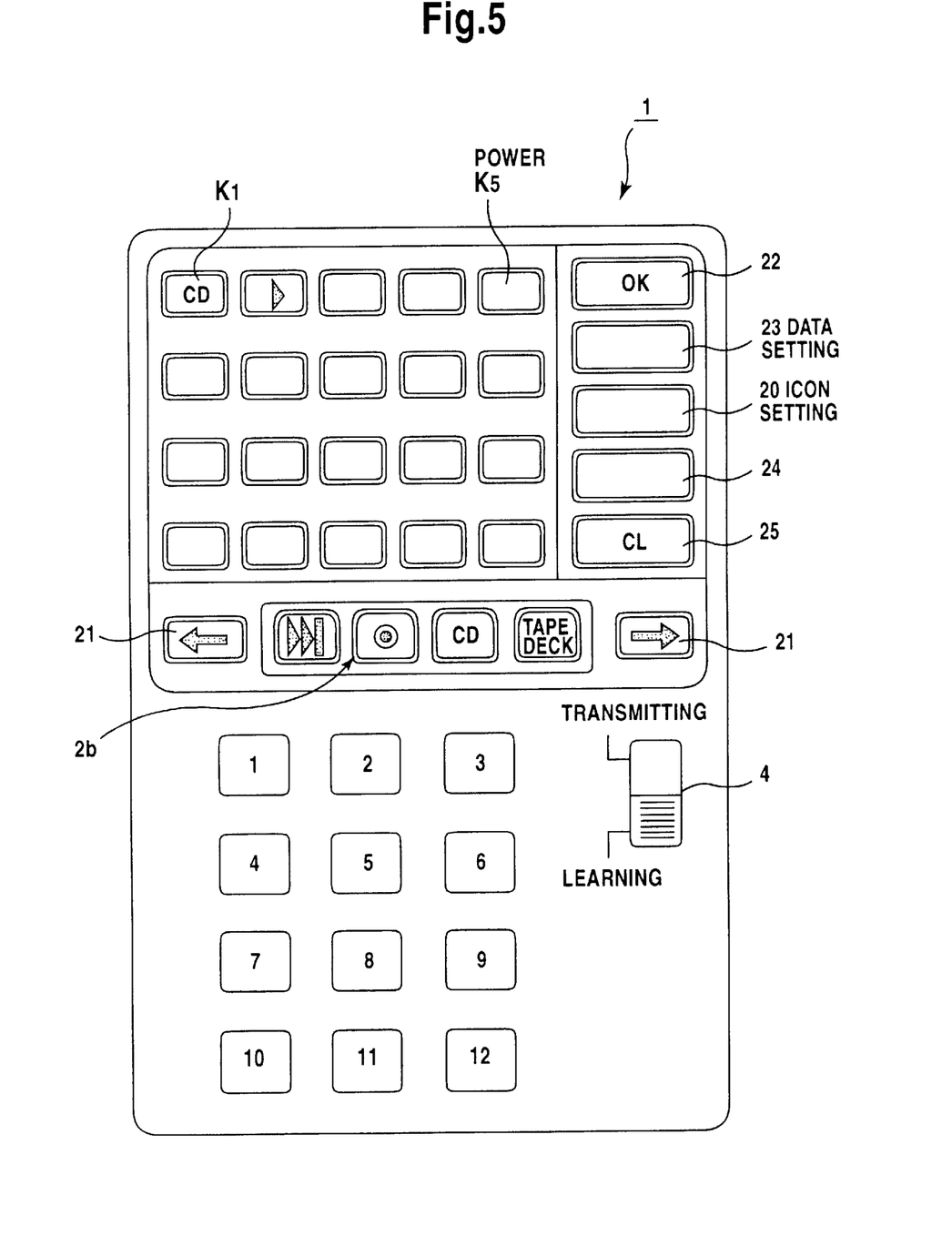
FIG. 5 is a top plan view of the remote control transmission apparatus with a selected icon registered in the "learning" input picture.

Upon pressing the "OK" indication area 22, the two operating areas kn stops blinking, and the selected icon is displayed in the desired operating area kn. At this time, the selected icon is stored in the RAM 13 at a predetermined address in correspondence with the desired operating area kn where to display the selected icon (step S8). FIG. 5 depicts the state in which the icon "power" has thus been displayed in the operating area k5.

In the case of selecting another icon and displaying it in another operating area kn, it is necessary to press this operating area kn and repeat the processes in and after step S6. If no operating area kn is newly pressed within a predetermined period of time, the procedure goes back to the display of the leaning input-item screen in step S3 (step S9).

In this icon learning operation, the selected icon can be displayed in an arbitrary operating area kn irrespective of whether control data has been registered in the operating area kn. Hence, an icon which serves as a caption can be displayed, for example, in an operating area kn from which no control data is transmitted even if it is pressed. In FIG. 5, the "CD" icon so selected as to be displayed in an operating area k1 is used as a caption of the neighboring operating areas kn where pieces of control data for controlling the CD are registered.

Upon pressing an operating area 23 bearing an indication "data setting" before the transparent touch panel 2 is pressed (step S2), the operating area 23 is displayed as positive, and the operating procedure proceeds to a control data registration mode which starts at step S10 in FIG. 3.

In step S10, an operating area kn where control data is intended to register is pressed. For example, in the case of registering control data for ON-OFF control of the CD power supply in the operating area k5 in FIG. 5, the operating area k5 is pressed. The thus pressed operating area k5 keeps on blinking until the control data is registered.

Since the operating areas kn where pieces of control data have already been registered are displayed as positive, it is easy to select the operating area kn desired to newly register control data. Furthermore, there is no fear of accidental rewriting of already registered control data by another control data.

Thereafter, as described previously, the transmitting end of a remote control transmitter to be learned (not shown) is directed toward the rear end of the remote control 1 in opposing relation thereto, and a key from which the control data to be learned (registered) is sent is pressed (step S11). Upon pressing the key, an infrared signal containing the control data is transmitted. When the control data and the transmission format are detected from the received infrared signal in the demodulation part 7, the blinking operating area kn blinks at shorter time intervals (step S12).

The reduction of the blinking period indicates the reception of the control data and the operating area kn where to register it. If no error is found, the operating area 22 bearing the indication "OK" is pressed (step S13).

Upon pressing "OK", the operating area kn stops from blinking and is displayed as positive, and the received controlled data is stored in the RAM 13 at a predetermined address in correspondence with that operating area kn (step S14).

In the case of registering another icon in another operating area kn, it is necessary to press this operating area kn and repeat the processes in and after step S11. If no operating area kn is newly pressed within a predetermined period of time, the procedure goes back to the display of the leaning input-item screen in step S3 (step S15).

In this control data registration mode, control data for ON-OFF control of the CD power supply can be registered, for example, in the operating area k5 bearing the indication "power" in FIG. 5.

The icons and the pieces of control data thus stored in correspondence with the operating areas kn can be cleared all at one time or for each operating area kn. To erase all the icons and control data stored in the RAM 13 in the learning mode, an operating area 24 bearing an indication "ACL" is pressed while awaiting the press of the transparent touch panel 2 (step S4). The thus pressed operating area 24 is displayed as positive (step S16), followed by pressing the operating area 22 bearing the indication "OK" (step S17) if the display is correct.

As a result, the positive display of the operating area 24 stops and all the icons and control data stored in the learning mode are erased (step S18), after which the procedure returns to the display of the learning input-item screen in step S3. Hence, in the learning input-item screen after step S18 all the operating areas kn are displayed as negative.

In the case of erasing an icon and control data associated with a specific operating area kn, an operating area 25 bearing an indication "CL" is pressed while awaiting the press of the transparent touch panel 2 (step S4). As a result, the operating area 25 turns positive (step S19). Then, the operating area kn from which it is desired to erase data is pressed, and if this operation is correct, the "OK" operating area 22 is pressed (step S20).

Upon pressing the operating area 22, the icon and control data associated with the specific operating area kn are erased (step S21), and the procedure returns to the display of the leaning input-item screen in step S3. In the learning input-item screen displayed after step S21, the operating area kn from which the data has been erased is turned negative.

Embodiment 2

Figure 7:
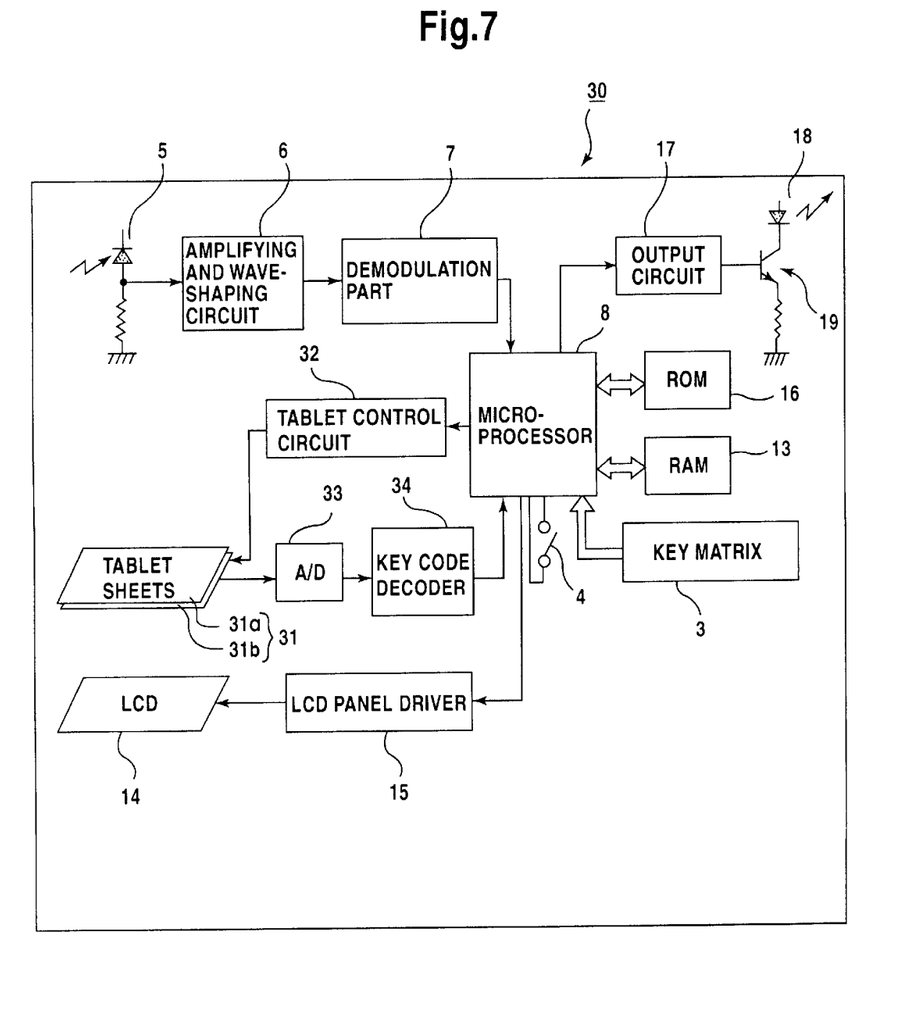
FIG. 7 is a block diagram depicting the configuration of a remote control transmission apparatus according to a second embodiment of the present invention.

FIG. 7 illustrates in block form a remote control 30 according to a second embodiment of the present invention. The remote control 30 identical in construction with that 1 of the first embodiment except that the transparent touch panel 2 forming the key input means of the latter is replaced with a transparent tablet 31. The parts corresponding to those of the remote control 1 are identified by the same reference numerals and no description will be given of them.

The transparent tablet 31 is one that detects, by the contact-resistance system, X and Y coordinates of the position where it is pressed. The tablet 31 is composed of a pair of opposed tablet sheets 31a and 31b formed by two flexible transparent insulating films and separated by an insulating spacer with a shallow gap defined therebetween. The two insulating films are coated uniformly over the entire areas of their opposite faces with transparent resistance layers, respectively. A tablet control circuit 32, which is connected to the microprocessor 8, applies a voltage across the uniform resistance layers of the two tablet sheets 31a and 31b alternately with each other, by which a uniform potential gradient is formed in them alternately in the direction perpendicular to their uniform resistance layers.

When the transparent tablet 31 is pressed, the tablet sheets 31a and 31b are pressed into contact with each other at the position where the tablet 31 is being pressed. By reading the potential at the position of contact by an A/D converter 33 through that one of the tablet sheets 31a and 31b to which the voltage is not supplied, it is possible to the coordinates of the position of contact in the direction of voltage application. Similarly, when the other tablet sheet is supplied with a voltage, the direction of voltage application is perpendicular to that in the above case. Hence, the coordinates of the position of contact in the direction of voltage application, which is perpendicular to that in the above case, can be obtained by the A/D converter 33 from the potential at the same position of contact as in the above case. That is, the position where the transparent tablet 31 is pressed can be obtained as X, Y coordinates.

A key code decoder 34, which is connected to the output of the A/D converter 33, divides the top surface of the transparent tablet 31 into a plurality of operating areas kn defined by X, Y coordinates. Based on x, y coordinates of the position on the tablet 31 being pressed, which are output from the A/D converter 33, the key code decoder 34 selects an operating area kn defined by the x, y coordinates, and provides to the microprocessor 8 a key code indicating the selected operating area kn. For example, assuming that the surface area of the transparent tablet 31 defined by X coordinate values 0 to 160 and Y coordinate values 0 to 120 is an operating area k1 and that the coordinates (90, 40) of the position of on the tablet 31 being pressed are input into the key code decoder 34, a key code indicating the operating area k1 is output therefrom to the microprocessor 8.

As described above, the transparent tablet 31 has its surface area divided into the plurality of operating areas kn and, when pressed in a particular one of them, outputs a key code representing the pressed area kn. Hence, the transparent tablet 31 can be used as a substitute for the transparent touch panel 2.

Since the remote control 30 has a construction in which the transparent tablet 31 is superimposed on the LCD panel 14 which is first display means, an icon and control data can be stored in correspondence with a particular operating area kn as in the first embodiment.

According to this embodiment, the use of the transparent tablet 31 as keying means makes it possible to freely choose the shapes and sizes of the operating areas kn that are divided. Accordingly, the operating areas need not always be arranged in matrix form; for example, the operating areas kn which are expected to be frequently pressed may be shaped so that they can easily be recognized and used. That is, the operating areas kn can be shaped according to the contents of their operation.

While in this embodiment the key code indicating the pressed operating area kn is provided to the microprocessor 8, provision may be made such that the microprocessor 8 detects the pressed operating area kn directly from the coordinates of the position on the tablet 31 where it is pressed. In this instance, the key code decoder 34 may be omitted.

The first and second embodiments have been described only in connection with the "learning" input-item screen displayed when the operating area "learning" is pressed in the category display field 2a in the learning mode. However, it is also possible to make provision such that, by pressing category indicating icon, for example, "VTR" in the learning mode, control data and icons already registered are modified in the "VTR" input-item screen.

Also, the order of icon learning operation starting at step S5 and the control data registering operation is arbitrary; the control data may be registered prior to the icon learning operation.

The LCD panel 14 need not necessarily be placed under the keying means; a display area of the LCD panel 14 may be disposed around the entire operating area kn. Incidentally, the individual operating area kn correspond to keys of the keying means. When the operating area kn is surrounded by the display area of the LCD panel 14 , they need not always be formed in a flat plane; for example, it is possible to form the keying means by keyboard switches arranged in matrix form and use its actuating areas as the operating areas kn.

In the above embodiments, the remote control signal containing control data is transmitted by pressing a desired operating area kn through the keying means, but it is also possible to transmitted the remote control signal through the use of an LCD which displays a cursor as well as icons, and coordinate input means.

Embodiment 3

Figure 8:
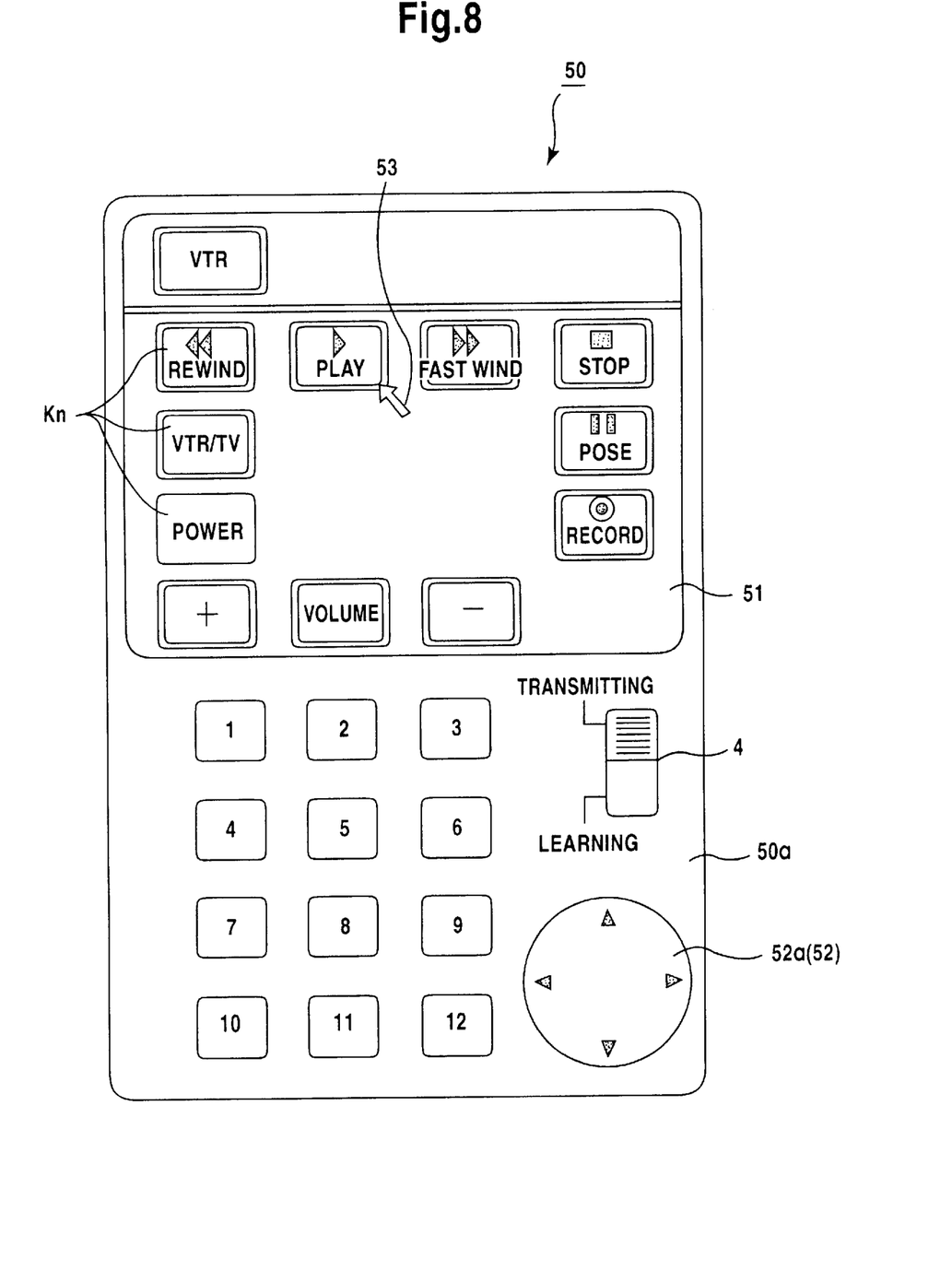
FIG. 8 is a top plan view illustrating the operating surface of a remote control transmission apparatus according to a third embodiment of the present invention.
Figure 9:
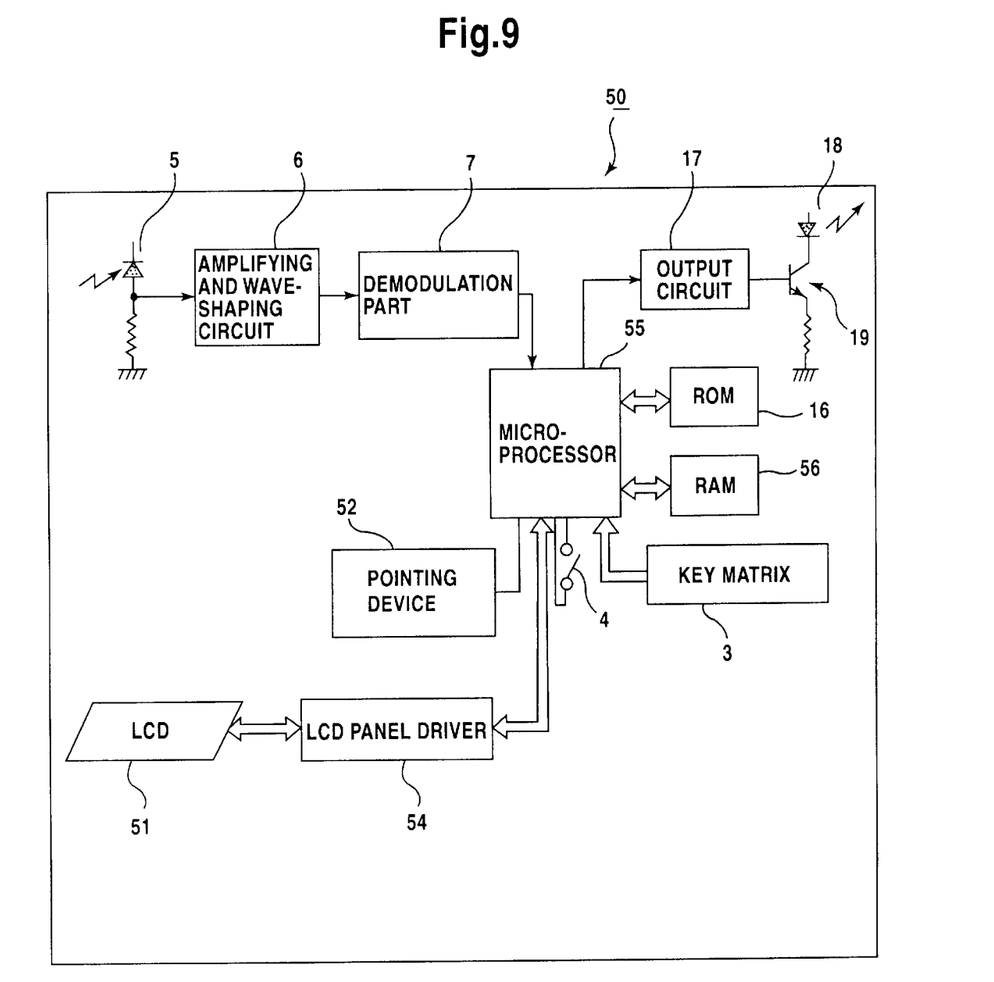
FIG. 9 is a block diagram illustrating the configuration of the remote control transmission apparatus according to the third embodiment of the present invention.

FIG. 8 is a top plan view of a remote control 50 according to a third embodiment which uses a pointing device as the coordinate input means. FIG. 9 is a block diagram illustrating the configuration of the remote control 50. The parts corresponding to those used in the remote control 1 are identified by the same reference numerals and no description will be given of them.

As depicted in FIG. 8, there are mounted on the operating panel 50a of the remote control 50, an LCD panel 51 and an input key 52a of a pointing device 52. As in the above embodiments, the LCD panel 51 displays various icons indicting categories of the devices to be controlled and the contents of their control, and displays an arrow-shaped cursor 53. The display position of the cursor 53 on the LCD panel 51 is moved by tilting the disc-shaped input key 52a in all directions in FIG. 8. That is, the input key 52a is supported centrally thereof by an input switch formed by a push-button switch though not shown, and is designed to tilt in the direction in which it is pressed at the peripheral portion thereof. The pointing device 52 has a plurality of detecting switches (not shown) disposed around the lower end portion of the input key 52a to detect the direction of tilt of the input key 52a. The pointing device 52 generates cursor control data from the results of detection by the switches, and provides it to a microprocessor 55 depicted in FIG. 9. Based on the cursor control data, the microprocessor 55 indicates the cursor display position to an LCD panel driver 54, driving the LCD panel 51 to move its cursor in the direction of tilt of the input key 52a.

For example, pressing the input key 52a at a position further to the right than the center thereof in FIG. 8, the display position of the cursor 53 moves to the right on the LCD panel 51. Thus, the cursor 53 can be displayed on the LCD panel 51 at any desired position by operating the pointing device 52.

Pressing the input key 52a at the center thereof after moving the cursor 53 to a predetermined position as mentioned above, the input switch is pressed into operation and the operation data is provided from the pointing device 52 to the microprocessor 55. When supplied with the operation data, the microprocessor 55 causes the LCD driver 54 to output the cursor-position coordinates indicating the display position of the cursor 53. The cursor-position coordinates correspond to the key code or pressed-position coordinates in the embodiments described previously. The operation of pressing a predetermined operating area kn to feed to the microprocessor 8 the key code indicating the pressed operating area kn is replaced with an operation of actuating the pointing device (input key 52a) 52 to feed to the microprocessor 55 the cursor-position coordinates of a predetermined position on the LCD panel 51.

The selection of a icon in the learning mode is performed by displaying a plurality of icons on the LCD panel 51, moving the cursor 53 to the icon desired to select and pressing the input switch into operation. The microprocessor 55 detects the selected icon based on the cursor-position coordinates input thereinto from the LCD driver 54 by the operation of the input switch. Thereafter, when pressing the input switch again after moving the cursor 53 to the icon display position where to display the selected icon, the selected icon is stored in a RAM 56 in correspondence with the cursor-position coordinates input at that time. Accordingly, in the transmission mode, the selected icon is read out of the RAM 56 and is displayed at the abovesaid icon display position.

In the learning mode, the control data of the remote control to be learned is stored in the RAM 56 in correspondence with the cursor-position coordinates at the time when the control data is received. That is, by moving in advance the cursor 53 through the operation of the pointing device 52 to the display position of an icon indicating the contents of control data and actuating the input switch upon receiving the control data, the received control data is stored in the RAM 56 in correspondence with the cursor-position coordinates, that is, the display position of the icon representing the contents of the control data.

In the transmission mode, when the input cursor-position coordinates are at the icon display position and the control data is stored in correspondence with that icon display position, the control data can be read out of the RAM 56 and into the microprocessor 55. Hence, by moving the cursor 53 to an icon indicating predetermined contents of control and then actuating the input switch, the control data stored in correspondence with that icon display position is read out and incorporated into a remote control signal, thereafter being transmitted from the light emitting diode 18 to the device to be controlled.

Accordingly, even if various pieces of control data are learned, they can each be stored in correspondence with the selected icon; hence, the display contents of the icon and the contents of control data can be made to coincide with each other. Furthermore, the icon can be displayed at a desired position regardless of whether control data is stored in correspondence with it.

This embodiment avoids the necessity of superimposing keying means, such as a transparent touch panel, on display means like an LCD panel or disposing the former around the latter. Hence, the display means is easy to see and can be provided in a limited area of the operating panel.

Moreover, learning of the icon display position and control data can be achieved through simple operation of the pointing device.

While the embodiments described above are common in using the RAMs 13 and 56 as the first and second control data storage means and the icon storage means, they may use RAMs formed by different parts and the storage means is not limited specifically to the RAM and other storage devices can be used.

According to the first aspect of the present invention, even if a large amount of control data for controlling a number of devices is stored, the number of operating areas kn need not be increased and an operating area kn corresponding to the device to be controlled can easily be found. Hence, the apparatus of the invention is easy to use.

Since the control data stored in correspondence with a particular operating area kn can be displayed therein by selecting an icon indicating the contents of the control data, the relationship between the operating area kn and the control data stored in correspondence therewith is clear to a user. Hence, there is no fear of an unintended device being erroneously actuated or unintended operation being carried out in remote control.

Further, no label need not be affixed to every key with a view to clearly indicating the above relationship between the operating area kn and the control data stored in association therewith.

In operating areas in correspondence with which no control data is stored, too, there can be displayed predetermined icons which indicate their captions or the like.

According to second and third aspects of the present invention, since the display part formed by a liquid crystal panel and the transparent touch panel are laminated, the operating area kn and the display part can be located at the same position; hence, the operating panel need not be made large.

Plural pieces of control data can be stored in correspondence with the same operating area on the display part formed by an LCD panel, and icons indicating their contents can be displayed individually. Accordingly, the plural pieces of control data can be transmitted without increasing the number of operating areas and their contents can be displayed by icons.

According to the third aspect of the present invention, since the operating area kn of the transparent tablet is divided according to the coordinates of positions on the tablet sheet, the divided operating areas can be shaped as desired.

According to the fourth aspect of the present invention, since the first display means for displaying an icon in the corresponding operating area in the transmission mode is used also as first display means for selecting an icon in the learning mode, the number of parts used can be reduced accordingly.

According to the fifth aspect of the present invention, even if plural pieces of control data for controlling a number of devices are stored, an icon corresponding to the contents of any control data can easily found, and the relationship between the icons and the control data stored in correspondence with the icon display positions is clear to the user. Hence, there is no fear of an unintended device being erroneously actuated or unintended operation being carried out in remote control.

In operating areas in correspondence with which no control data is stored, too, there can be displayed predetermined icons which indicate their captions or the like.

There is no need of superimposing keying means, such as a transparent touch panel, on display means like an LCD panel or disposing the former around the latter. Hence, the display means is easy to see and can be provided in a limited area of the operating panel.

Moreover, learning of the icon display position and control data can be achieved through simple operation of the pointing device.

It will be apparent that many modifications and variations may be effected without departing from the scope of the novel concepts of the present invention.

What is claimed is:

1. A remote control transmission apparatus, comprising:

receiving means for receiving a remote control signal containing control data for controlling a device from another remote control transmission apparatus;

detecting means for detecting said control data from said received remote control signal;

keying means divided into a plurality of operating areas;

first control data storage means for storing said control data in correspondence with a predetermined one of said plurality of operating areas;

icon selecting means for selecting a predetermined icon from plural kinds of icons;

icon storage means for storing said selected icon in correspondence with said operating area indicated by said selected icon;

first display means for displaying said stored icon in said operating area corresponding thereto;

transmitting means for transmitting a remote control signal containing control data to a device to be controlled; and mode selecting means for selecting either one of learning and transmitting modes of operation;

wherein, in said learning mode, said control data detected from said received remote control signal and said icon selected from said plural kinds of icons are stored in predetermined areas, respectively;

wherein, in said transmitting mode, if an icon is stored in correspondence with one of sad plurality of operating areas, the corresponding operating areas is indicated by said icon, and if control data is stored in correspondence with one of said operating areas, the corresponding operating area is pressed to transmit said remote control signal containing said stored control data to said device to be controlled; and wherein said plurality of operating areas operate as changeable icon designating and displaying fields and key code input fields.

2. The remote control transmission apparatus of claim 1, wherein said keying means is a transparent touch panel which is laminated over said first display means formed by a liquid crystal panel and which is divided into said operating areas arranged in a matrix form.

3. The remote control transmission apparatus of claim 1, wherein said keying means keying means is a transparent tablet which is laminated over said first display means formed by a liquid crystal panel and which is divided into said plurality of operating areas divided according to the coordinates of positions on said tablet sheet where to press it.

4. The remote control transmission apparatus of claim 2 or 3, wherein, in the learning mode, said icon selecting means causes said first display means to display plural kinds of icons one after another so that, by pressing a predetermined operating area, the icon displayed in said pressed operating area is selected as a predetermined icon.

5. A remote control transmission apparatus, comprising:

receiving means for receiving a remote control signal containing control data for controlling a device from another remote control transmission apparatus;

detecting means for detecting said control data from said received remote control signal;

second display means for displaying an icon and a cursor in a display part;

icon selecting means for selecting a predetermined icon from plural kinds of icons;

icon displaying means for displaying said selected icon on said display part at an arbitrary position;

second control data storage means for storing control data in correspondence with the position where said predetermined icon is stored;

coordinate input means for controlling the movement of said cursor on said display part and for inputting coordinates of the position of said cursor at the time of an input witch actuation;

transmitting means for transmitting a remote control signal containing control data to a device to be controlled; and mode selecting means for selecting either one of learning and transmitting modes of operation;

wherein, in said learning mode, said control data decoded from said received remote control signal and the icon selected from said plural kinds of icons are stored in correspondence with predetermined icon display positions, respectively;

wherein, in said transmitting mode, said selected icon is displayed at the icon display position associated therewith, and when said cursor coordinates input via said coordinate input means are at an icon display position, control data stored in correspondence with the said icon display position is incorporated in a remote control signal and transmitted to a device to be controlled; and wherein said plurality of operating areas operate as changeable icon designating and displaying fields and key code input fields.

* * * * *

UNITED STATES PATENT AND TRADEMARK OFFICE
CERTIFICATE OF CORRECTION

PATENT NO.   : 6,198,481 B1
DATED        : March 6, 2001
INVENTOR(S)  : Sadao Urano et al.

It is certified that error appears in the above-identified patent and that said Letters Patent is hereby corrected as shown below:

<u>Title page,</u>
Item [73], Assignee should read as follows:
NEC Corporation, Tokyo, (JP) and SMK Corporation, Tokyo, (JP).

Signed and Sealed this

Twenty-ninth Day of January, 2002

*Attest:*

JAMES E. ROGAN
*Attesting Officer*    *Director of the United States Patent and Trademark Office*